United States Patent [19]

Miyawaki et al.

[11] Patent Number: 4,532,980
[45] Date of Patent: Aug. 6, 1985

[54] METHOD AND APPARATUS FOR REMOVING FINE COLD SHUT CRACKS ON HORIZONTALLY AND CONTINUOUSLY CAST STEEL STRAND USING EJECTION OF A PLURALITY OF METAL SHOTS

[76] Inventors: Yoshiharu Miyawaki, 4-1, Kitayoshizu-cho, Fukuyama City, Hiroshima Pref.; Takeshi Hirose, 1-2-19, Fujimi, Chiyoda-ku, Tokyo; Yoneichi Hamada, 1665-4, Zao-Cho, Fukuyama City, Hiroshima Pref.; Seishi Mizuoka, 161-38, Tsunoshita, Daimon-cho, Fukuyama City, Hiroshima Pref.; Masahiro Tsuru, 4-34-1, Kishiya, Tsurumi-ku, Yokohama City, Kanagawa Pref., all of Japan

[21] Appl. No.: 540,835

[22] Filed: Oct. 11, 1983

[30] Foreign Application Priority Data

Oct. 12, 1982 [JP] Japan ................................ 57-178884
Jul. 22, 1983 [JP] Japan ................................ 58-134189

[51] Int. Cl.$^3$ ........................ B22D 11/10; B22D 11/12
[52] U.S. Cl. ..................................... 164/475; 164/415; 164/417; 164/440; 164/476; 164/477; 164/490
[58] Field of Search ............... 164/477, 476, 417, 486, 164/490, 440, 444, 475, 415

[56] References Cited

U.S. PATENT DOCUMENTS 2,565,959  8/1951  Francis et al. ................ 164/486 X
3,693,701  9/1972  Waclawiczek ................ 164/417 X

FOREIGN PATENT DOCUMENTS

58-128255  7/1983  Japan .

Primary Examiner—Nicholas P. Godici
Assistant Examiner—J. Reed Batten, Jr.

[57] ABSTRACT

A method and an apparatus for removing fine cold shut cracks on a horizontally and continuously cast steel strand, using ejection of a plurality of metal shots, comprises: horizontally and intermittently withdrawing a cast steel strand from a horizontal mold by a plurality of cycles each comprising a pull and a push, cooling the cast steel strand in a cooling zone provided following the horizontal mold on the same horizontal level as that of the horizontal mold, increasing the temperature of the surface portion of the solidified shell of the cast steel strand in a heat-restoring zone provided following the cooling zone on the same horizontal level as that of the cooling zone, to soften the surface portion of the solidified shell of the cast steel strand, and then continuously ejecting a plurality of metal shots from a plurality of shooters in a shooting zone provided following the heat-restoring zone on the same horizontal level as that of the heat-restoring zone onto the cast steel strand, to weld fine cold shut cracks produced on the surface portion of the solidified shell of the cast steel strand under the pressure applied by the plurality of metal shots thus ejected, thereby substantially completely removing the fine cold shut cracks.

12 Claims, 13 Drawing Figures

METHOD AND APPARATUS FOR REMOVING FINE COLD SHUT CRACKS ON HORIZONTALLY AND CONTINUOUSLY CAST STEEL STRAND USING EJECTION OF A PLURALITY OF METAL SHOTS

REFERENCE TO PATENTS, APPLICATIONS AND PUBLICATIONS PERTINENT TO THE INVENTION

A prior art document pertinent to the present invention is Japanese Patent Provisional Publication No. 128255/83 dated July 30, 1983.

The contents of the above-mentioned prior art document will be discussed under the heading of the "BACKGROUND OF THE INVENTION".

FIELD OF THE INVENTION

The present invention relates to a method and an apparatus for substantially completely removing, using ejection of a plurality of metal shots, fine cold shut cracks produced on the surface portion of the solidified shell of a cast steel strand due to the horizontal and intermittent withdrawal of the cast steel strand from a horizontal mold of a horizontal type continuous casting machine by a plurality of cycles each comprising a pull and a push.

BACKGROUND OF THE INVENTION

A horizontal type continuous casting machine for manufacturing a cast steel strand is now industrialized, in which machine a cast steel strand is horizontally and intermittently withdrawn from a horizontal mold fitted to the lower portion of the side wall of a tundish containing molten steel, by a plurality of cycles each comprising a pull and a push.

Figure 1:
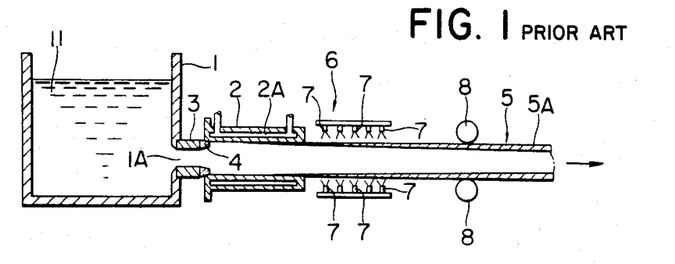
FIG. 1 is a schematic longitudinal sectional view illustrating the conventional horizontal type continuous casting mechine.

The above-mentioned conventional horizontal type continuous casting machine is described below with reference to FIG. 1. In FIG. 1, 1 is a tundish for containing molten steel 11 from a ladle (not shown); 2 is a horizontal mold having a cooling water passage 2A in the wall thereof. The horizontal mold 2 is horizontally fitted, through a feed nozzle 3 and a break ring 4, to an opening 1A formed in the lower portion of the side wall of the tundish 1, and is cooled by cooling water supplied into the cooling water passage 2A. In FIG. 1, 5 is a cast steel strand having a square cross-sectional shape, which has been horizontally and intermittently withdrawn by a plurality of pinch rolls described later from the horizontal mold 2; 5A is a solidified shell of the cast steel strand 5; 6 is a cooling zone provided following the horizontal mold 2 on the same horizontal level as that of the horizontal mold 2; 7 are a plurality of spray nozzles provided in the cooling zone 6, the plurality of spray nozzles 7 spraying cooling water from above and below the cast steel strand 5 onto the surface of the solidified shell 5A of the cast steel strand 5 passing through the cooling zone 6 to cool the cast steel strand 5; and 8 are a plurality of pinch rolls for horizontally and intermittently withdrawing the cast steel strand 5 from the horizontal mold 2 by a plurality of cycles each comprising a pull and a push.

The cast steel strand 5 is manufactured as follows using the above-mentioned conventional horizontal type continuous casting machine. Molten steel 11 contained in the tundish 1 flows through the feed nozzle 3 and the break ring 4 into the horizontal mold 2 and is cooled therein. The cast steel strand 5 thus cast is horizontally and intermittently withdrawn from the horizontal mold 2 by the pinch rolls 8. Then, the cast steel strand 5 is cooled by cooling water ejected from the plurality of spray nozzles 7 provided in the cooling zone 6 onto the surface of the solidified shell 5A of the cast steel strand 5 passing through the cooling zone 6. Then, the cast steel strand 5 is completely solidified to the core by natural cooling. The cast steel strand 5 is thus continuously manufactured.

Figure 2:
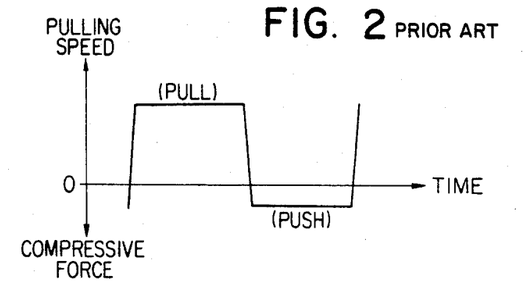
FIG. 2 is a descriptive graph illustrating an example of the conventional cycle comprising a pull and a push for horizontally and intermittently withdrawing a cast steel strand from a horizontal mold.

An example of the above-mentioned cycle comprising a pull and a push which is applied to the cast steel strand 5 is illustrated in FIG. 2. In FIG. 2, the abscissa shows time, and the ordinate indicates the pulling speed of the cast steel strand 5 in the upper half starting from the point 0, and the compressive force applied to the cast steel strand 5 by a push of the cast steel strand 5 in the lower half starting from the above mentioned point 0.

Figure 3A:
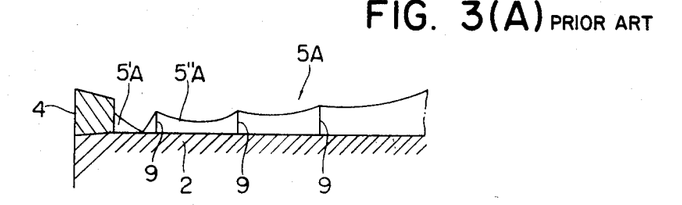
FIG. 3(A) is a descriptive drawing illustrating the formation of a solidified shell of a cast steel strand during a pull in the conventional one cycle comprising a pull and a push for horizontally and intermittently withdrawing a cast steel strand from a horizontal mold.
Figure 3B:
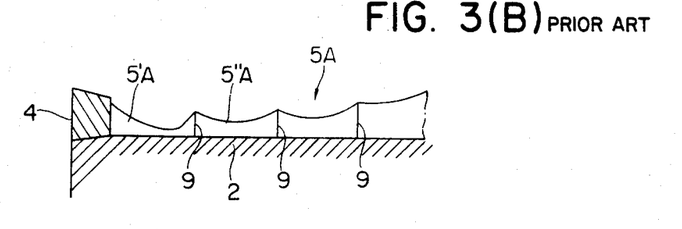
FIG. 3(B) is a descriptive drawing illustrating the formation of a solidified shell of a cast steel strand upon the completion of the conventional one cycle comprising a pull and a push for horizontally and intermittently withdrawing a cast steel strand from a horizontal mold.

FIGS. 3(A) and 3(B) illustrate partial sectional views of the formation of the solidified shell 5A of the cast steel strand 5 in the horizontal mold 2 when horizontally and intermittently withdrawing the cast steel strand 5 in consecution from the horizontal mold 2. FIG. 3(A) is a partial sectional view illustrating the formation of a solidified shell 5'A of the cast steel strand 5 during the pull in one cycle comprising a pull and a push of the cast steel strand 5, whereas FIG. 3(B) is another partial sectional view illustrating the formation of the solidified shell 5'A of the cast steel strand 5 upon the completion of the above-mentioned one cycle.

The cast steel strand 5 is horizontally pulled from the horizontal mold 2 at a prescribed pulling speed for a prescribed pulling time. Then, the cast steel strand 5 is pushed back in the direction opposite to the pulling direction for a prescribed pushing time. This pushing back prevents the solidified shell 5A of the cast steel strand 5 from being broken due to heat contraction in the horizontal mold 2 and a breakout from occurring as a result.

However, an incompletely welded portion known as a cold shut 9 is formed on the juncture face between two adjacent portions 5'A and 5"A of the solidifed shell 5A of the cast steel strand 5, which adjacent portions 5'A and 5"A are formed by a plurality of cycles each comprising a pull and a push.

The cause of the formation of the above-mentioned cold shut 9 is as follows. As shown in FIGS. 3(A) and 3(B), the solidifed shell 5'A of the cast steel strand 5 formed during one cycle comprising a pull and a push is cooled from three sides including not only the side facing the horizontal mold 2 but also the side facing the break ring 4 and the side facing the solidified shell 5"A of the cast steel strand 5 which has already been formed in the cycle precedent to that one cycle. As a result, solidification of the solidified shell 5'A of the cast steel strand 5 begins on the three sides mentioned above. The structure of the solidified shell 5'A which contacts with the solidified shell 5"A of the cast steel strand 5 grows horizontally and in the direction opposite to that of the structure of the solidified shell 5"A of the cast steel strand 5. As a result, the structure of the juncture face between the solidified shells 5'A and 5"A of the cast steel strand 5 becomes discontinuous so that a complete welding is not achieved at this juncture face. This causes occurrence of a cold shut 9.

The above-mentioned cold shut 9 poses no problem if it is completely welded, but when not welded completely, cracks are produced along the cold shut 9 at the time of thermal contraction of the solidified shell 5A of the cast steel strand 5 caused by cooling in the cooling zone 6. These cracks become fine cold shut cracks. When the cast steel strand 5 having these fine cold shut cracks is rolled, these fine cold shut cracks remain on the surface portion of the resultant rolled product, thus remarkably deteriorating the quality of the rolled product.

For the removal of these fine cold shut cracks the following method is conceivable: shortening the time of one cycle comprising a pull and a push of the cast steel strand 5 to inhibit growth of the structure of the cold shut 9 and maintaining the temperature of the solidified shell 5A of the cast steel strand 5 on a high level, to thereby improve the weldability of the cold shut 9.

To shorten the time of a cycle however requires a control technique of accomplishing the cycle of a pull and a push at a high accuracy, and is consequently difficult to practice. Even when such a control technique is developed, for example in the case of a cast steel strand having a square cross-section, the four corners of the cast steel strand are over-cooled as compared with the other portions. It is therefore impossible to substantially completely remove the fine cold shut cracks.

Also in the horizontal type continuous casting method comprising pulls and pushes of the cast steel strand 5 as mentioned above, the cold shut 9 can be welded by increasing the pushing force of the cast steel strand 5 to some extent. However, if an excessive pushing force is applied to the cast steel strand 5, buckling occurs in the solidified shell 5A of the cast steel strand 5, resulting in a breakout of unsolidified molten steel.

A method for solving the above-mentioned problem is disclosed in Japanese Patent Provisional Publication No. 128255/83 (hereinafter referred to as the "prior art"). The prior art is described below with reference to FIG. 4.

Figure 4:
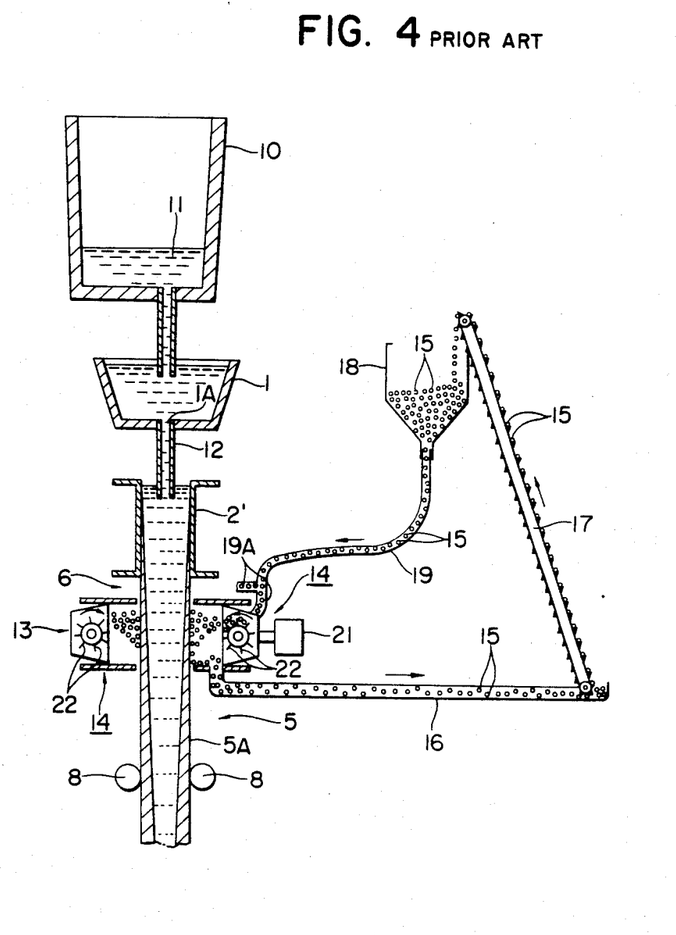
FIG. 4 is a schematic descriptive view illustrating the apparatus of the prior art.

In FIG. 4, 10 is a ladle; 1 is a tundish containing molten steel 11 from the ladle 10; 12 is a teeming nozzle fixed vertically to an opening 1A of the bottom wall of the tundish 1; 2' is a vertical mold provided directly below the tundish 1; 5 is a cast steel strand vertically downwardly withdrawn continuously from the vertical mold 2' by a plurality of pinch rolls 8; 5A is a solidified shell of the cast steel strand 5; 6 is a cooling zone provided following the vertical mold 2' on the same vertical level as that of the vertical mold 2', a plurality of spray nozzles (not shown) for ejecting cooling water onto the solidified shell 5A of the cast steel strand 5 withdrawn from the vertical mold 2' being provided in the cooling zone 6; 13 is a shooting zone provided following the cooling zone 6 on the same vertical level as that of the cooling zone 6; and 14 are a plurality of shooters provided in the shooting zone 13, each of the plurality of shooters 14 continuously ejecting a plurality of metal shots 15 onto the surface of the solidified shell 5A of the cast steel strand 5.

The plurality of metal shots 15 discharged from the shooting zone 13 after ejection onto the surface of the solidified shell 5A of the cast steel strand 5 are supplied in recycle into the plurality of shooters 14 in the shooting zone 13 by a metal shot recycling means.

The above-mentioned metal shot recycling means comprises: a metal shot discharge pipe 16 for transporting the plurality of metal shots 15 discharged from the shooting zone 13 after ejection onto the surface of the solidified shell 5A of the cast steel strand 5 to a conveyor described later, the metal shot discharge pipe 16 being downwardly inclined toward the downstream end thereof; a conveyor 17 for transporting the plurality of metal shots 15 discharged through the metal shot discharge pipe 16 to a hopper described later, the conveyor 17 being provided substantially vertically at the downstream end of the metal shot discharge pipe 16; a hopper 18 for storing the plurality of metal shots 15 received from the conveyor 17 and supplying same to the plurality of shooters 14 in the shooting zone 13, the hopper 18 being provided above the shooting zone 13; and a metal shot supply pipe 19 for communicating the hopper 18 with the shooting zone 13, the metal shot supply pipe 19 supplying the plurality of metal shots 15 through respective branch pipes 19A into the plurality of shooters 14 in the shooting zone 13.

Figure 5:
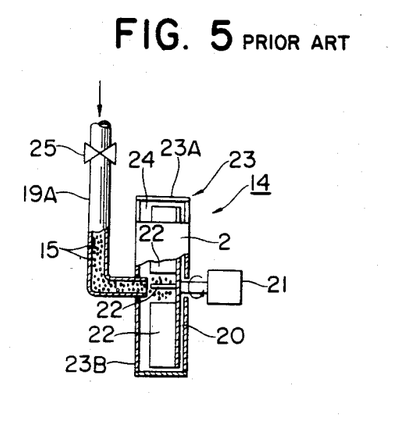
FIG. 5 is a partially cutaway front view of the shooter in the apparatus of the prior art.

Now, the shooter 14 is described with reference to FIG. 5. In FIG. 5, 20 is a vertical disk; 21 is a motor for rotating the vertical disk 20 at a high speed; 22 are a plurality of impellers radially and vertically fixed to one surface of the vertical disk 20; 23 is a cover for covering the vertical disk 20 and the plurality of impellers 22; 24 is a shooting port formed at a portion of a peripheral wall 23A of the cover 23; and 25 is a valve fitted to each of the respective branch pipes 19A of the metal shot supply pipe 19 for regulating the flow rate of the plurality of metal shots 15.

The branch pipe 19A of the metal shot supply pipe 19 communicates with the central portion of one of vertical side walls 23B of the cover 23. When the plurality of metal shots 15 in the hopper 18 are supplied to the rotational center portion of the plurality of impellers 22 rotating at a high speed through the branch pipe 19A of the metal shot supply pipe 19, the plurality of impellers 22 continuously eject at a high speed the plurality of metal shots 15 from the shooting port 24 onto the surface of the solidified shell 5A of the cast steel strand 5.

The plurality of metal shots 15, made of steel or cast iron, have a diameter of from about 0.5 mm to about 3.5 mm.

In FIG. 4, the branch pipe 19A of the metal shot supply pipe 19 and the metal shot discharge pipe 16, which are illustrated for only one of the two shooters 14, are of course fitted also to the other shooters 14.

As shown in FIG. 4, fine cold shut cracks on the surface portion of the solidified shell 5A of the cast steel strand 5 are removed by the above-mentioned prior art as follows. The cast steel strand 5 vertically downwardly withdrawn continuously from the vertical mold 2' by the plurality of pinch rolls 8 is cooled in the cooling zone 6 by cooling water ejected from the plurality of spray nozzles not shown onto the surface of the solidified shell 5A of the cast steel strand 5 passing through the cooling zone 6. Then, the plurality of metal shots 15 are continuously ejected in the shooting zone 13 from the plurality of shooters 14 onto the surface of the solidified shell 5A of the cast steel strand 5 passing through the shooting zone 13. Fine cold shut cracks, which have been produced on the surface portion of the solidified shell 5A of the cast steel strand 5 withdrawn from the vertical mold 2', are welded and removed under the pressure applied by the plurality of metal shots 15 thus ejected. The plurality of metal shots 15 discharged from the shooting zone 13 after ejection onto the surface of the solidified shell 5A of the cast steel strand 5 in the shooting zone 13 are transported through the metal shot discharge pipe 16 to the conveyor 17, and then transported on the conveyor 17 to the hopper 18 for use in recycle.

According to the prior art described above, it is possible to remove the fine cold shut cracks of the cast steel strand manufactured by a vertical type continuous casting machine. Direct application of this prior art to the above-mentioned horizontal type continuous casting machine allows removal of the fine cold shut cracks of a horizontally and continuously cast steel strand.

However, the above-mentioned prior art involves the following problems. In the prior art, since the shooting zone 13 is provided immediately following the cooling zone 6, the plurality of metal shots 15 are ejected onto the surface of the solidified shell 5A of the cast steel strand 5 immediately after cooling in the cooling zone 6. However, ejection of the plurality of metal shots 15 onto the surface of the solidified shell 5A of the cast steel strand 5 which has been hardened by cooling in the cooling zone 6 does not permit substantially complete welding and removal of the cold shut cracks which have been produced in the surface portion of the solidified shell 5A of the cast steel stand 5, under the pressure applied by the plurality of metal shots 15.

For these reasons, there is a strong demand for the development of a method and an apparatus which permit substantially complete welding and removal of the fine cold shut cracks of a horizontally and continuously cast steel strand, with the use of ejection of a plurality of metal shots, but such method and apparatus have not been proposed as yet.

SUMMARY OF THE INVENTION

An object of the present invention is therefore to provide, when manufacturing a cast steel strand by a horizontal type continuous casting machine, a method and an apparatus which permit substantially complete welding and removal of fine cold shut cracks produced on the surface portion of a solidified shell of a horizontally and continuously cast steel strand, under the pressure applied by a plurality of metal shots ejected onto the surface of said solidified shell.

Another object of the present invention is to provide, when manufacturing a cast steel strand by a horizontal type continuous casting machine, a method and an apparatus which facilitate welding and removal of fine cold shut cracks produced on the surface portion of a soidified shell of a horizontally and continuously cast steel strand, under the pressure applied by a plurality of metal shots ejected onto the surface of said solidified shell, by keeping said cast steel strand in a non-oxidizing atmosphere to prevent oxidation of said fine cold shut cracks.

A further another object of the present invention is, when manufacturing a cast steel strand by a horizontal type continuous casting machine, to provide a method and an apparatus which permit drying without using any additional fuel a plurality of metal shots which are wet by cooling water and which are ejected onto the surface of a solidified shell of a horizontally and continuously cast steel strand for the purpose of welding and removal of fine cold shut cracks produced on the surface portion of said solidified shell.

In accordance with one of the features of the present invention, there is provided a method for removing fine cold shut cracks on a horizontally and continuously cast steel strand uisng ejection of a plurality of metal shots, which comprises:

horizontally and intermittently withdrawing a cast steel strand from a horizontal mold fitted to the lower portion of the side wall of a tundish containing molten steel by a plurality of cycles each comprising a pull and a push;

spraying cooling water, in a cooling zone provided following said horizontal mold on the same horizontal level as that of said horizontal mold, onto the surface of a solidified shell of said cast steel strand passing through said cooling zone, to cool said cast steel strand;

continuously ejecting a plurality of metal shots, in a shooting zone provided following said cooling zone on the same horizontal level as that of said cooling zone, onto the surface of said solidified shell of said cast steel strand passing through said shooting zone, to weld fine cold shut cracks produced on the surface portion of said solidified shell of said cast steel strand by said plurality of cycles each comprising a pull and a push under the pressure applied by means of said plurality of metal shots thus ejected, to remove said fine cold shut cracks;

discharging, after said ejection onto the surface of said solidified shell of said cast steel strand, said plurality of metal shots from said shooting zone; and directing said plurality of metal shots discharged from said shooting zone into said shooting zone for reuse in recycle;

characterized by:

providing a heat-restoring zone, substantially on the same horizontal level as that of said cooling zone and said shooting zone, between said cooling zone and said shooting zone, where the temperature of the surface portion of said solidified shell of said cast steel strand passing through said heat-restoring zone is re-increased with the use of heat of molten steel in the interior of said cast steel strand, to soften the surface portion of said solidified shell of said cast steel strand, thereby facilitating said welding and said removal of said fine cold shut cracks in said shooting zone.

DETAILED DESCRIPTION OF PREFERRED EMBODIMENTS

From the aforementioned point of view, we carried out extensive studies with a view to achieving, when manufacturing a cast steel strand by a horizontal type continuous casting machine, a method and an apparatus which permit substantially complete welding and removal of fine cold shut cracks produced on the surface portion of a solidified shell of a horizontally and continuously cast steel strand, under the pressure applied by a plurality of ejected metal shots. As a result, we obtained the following finding. Even by ejecting a plurality of metal shots onto the surface of the solidified shell of the cast steel strand, on which surface portion there are produced fine cold shut cracks, these fine cold shut cracks cannot be substantially completely welded and removed. This is due to the decrease in the temperature of the surface portion of the solidified shell of the cast steel strand in the cooling zone and the resultant hardening of the surface portion of the solidified shell. It is therefore possible to substantially completely weld and remove the fine cold shut cracks by means of the pressure applied by the plurality of ejected metal shots by re-increasing the temperature of the surface portion of the solidified shell to soften the surface portion of the solidified shell.

The present invention was made on the basis of the above-mentioned finding. The method and the apparatus for removing fine cold shut cracks produced on the surface portion of a solidified shell of a horizontally and continuously cast steel strand of the present invention is described below with reference to the drawings.

Figure 6:
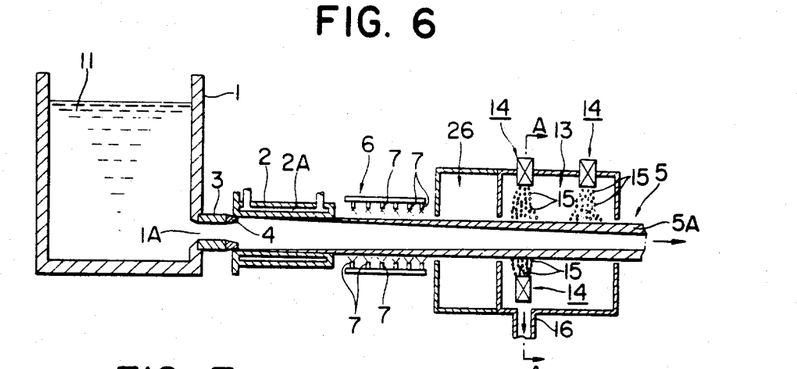
FIG. 6 is a schematic descriptive view illustrating an embodiment of the apparatus of the present invention as installed on the conventional horizontal type continuous casting machine.
Figure 7:
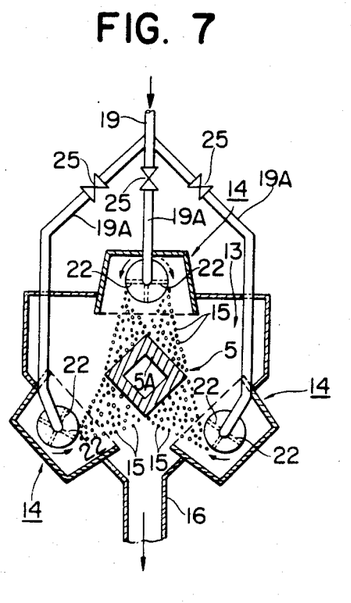
FIG. 7 is a sectional view of FIG. 6 cut along the line A—A.

FIG. 6 is a schematic descriptive view illustrating an embodiment of the apparatus of the present invention as installed on the conventional horizontal type continuous casting machine, and FIG. 7 is a sectional view of FIG. 6 cut along the line A—A. In FIGS. 6 and 7, 1 is a tundish for containing molten steel 11 from a ladle (not shown); 2 is a horizontal mold having a cooling water passage 2A in the wall thereof. The horizontal mold 2 is horizontally fitted, through a feed nozzle 3 and a break ring 4, to an opening 1A formed at the lower portion of the side wall of the tundish 1, and is cooled by cooling water supplied into the cooling water passage 2A. In FIGS. 6 and 7, 5 is a cast steel strand having a square cross-sectional shape, which has been horizontally and intermittently withdrawn by a plurality of pinch rolls (not shown) from the horizontal mold 2; 5A is a solidified shell of the cast steel strand 5; 6 is a cooling zone provided following the horizontal mold 2 on the same horizontal level as that of the horizontal mold 2; 7 are a plurality of spray nozzles provided in the cooling zone 6, the plurality of spray nozzles 7 spraying cooling water from above and below the cast steel strand 5 onto the surface of the solidified shell 5A of the cast steel strand 5 passing through the cooling zone 6 to cool the cast steel strand; 26 is a heat-restoring zone provided following the cooling zone 6 on the same horizontal level as that of the cooling zone 6, the heat-restoring zone 26 re-increasing the temperature of the surface portion of the solidified shell 5A of the cast steel strand 5 passing through the heat-restoring zone 26 with the use of heat of molten steel in the interior of the cast steel strand 5 to soften the surface portion of the solidified shell 5A; 13 is a shooting zone provided following the heat-restoring zone 26 on the same horizontal level as that of the heat-restoring zone 26; 14 are a plurality of shooters provided in the shooting zone 13, each of the plurality of shooters 14 having the same construction as that of the conventional one shown in FIG. 5, and continuously ejecting a plurality of metal shots 15 of the same material and the same size as those of the conventional metal shots mentioned previously, onto the surface of the solidified shell 5A of the cast steel strand 5; 16 is a metal shot discharge pipe communicating with the bottom of the shooting zone 13; 19 is a metal shot supply pipe for supplying the plurality of metal shots 15 through respective branch pipes 19A into the plurality of shooters 14 provided in the shooting zone 13; and 25 is a valve, provided in the middle of each of the plurality of branch pipes 19A, for regulating the flow rate of the plurality of metal shots 15.

The plurality of shooters 14 are installed two each above and below the cast steel strand 5. The two upper shooters 14 are installed at a prescribed interval in the longitudinal direction of the cast steel strand 5. The two lower shooters 14 are installed at a prescribed interval in the width direction of the cast steel strand 5. Each of the two upper shooters 14 ejects the plurality of metal shots 15 onto respective one of the two upper surfaces of the cast steel strand 5. Each of the two lower shooters 14 ejects the plurality of metal shots 15 onto each of the two lower surfaces of the cast steel strand 5.

Fine cold shut cracks on the surface portion of the solidified shell 5A of the cast steel strand 5 are welded and removed as follows by means of the above-mentioned apparatus of the present invention. The cast steel strand 5 is horizontally and intermittently withdrawn from the horizontal mold 2 by a plurality of cycles each comprising a pull and a push. Then, the cast steel strand 5 is cooled by cooling water sprayed from the plurality of spray nozzles 7 provided in the cooling zone 6 onto the surface of the solidified shell 5A of the cast steel strand 5 passing through the cooling zone 6 to accelerate growth of the thickness of the solidified shell 5A. Then, in the heat-restoring zone 26, the temperature of the surface portion of the solidified shell 5A of the cast steel strand 5 passing through the heat-restoring zone 26 is re-increased under the effect of heat of molten steel in the interior of the cast steel strand 5. This softens the surface portion of the solidified shell 5A of the cast steel strand 5. Then, the plurality of metal shots 15 are continuously ejected in the shooting zone 13 from the plurality of shooters 14 onto the thus softened surface of the solidified shell 5A of the cast steel strand 5 passing through the shooting zone 13. As a result, fine cold shut cracks produced on the surface portion of the solidified shell 5A of the cast steel strand 5 by the plurality of cycles each comprising a pull and a push are welded and removed under the pressure applied by the plurality of metal shots 15 thus ejected.

The plurality of metal shots 15 discharged from the shooting zone 13 after ejection onto the surface of the solidified shell 5A of the cast steel strand 5 passing through the shooting zone 13, are recycled by means of a metal shot recycling means using for example a pneumatic carrier gas into the plurality of shooters 14 in the shooting zone 13. An embodiment of the metal shot recycling means using the pneumatic carrier gas will be described later.

Figure 8:
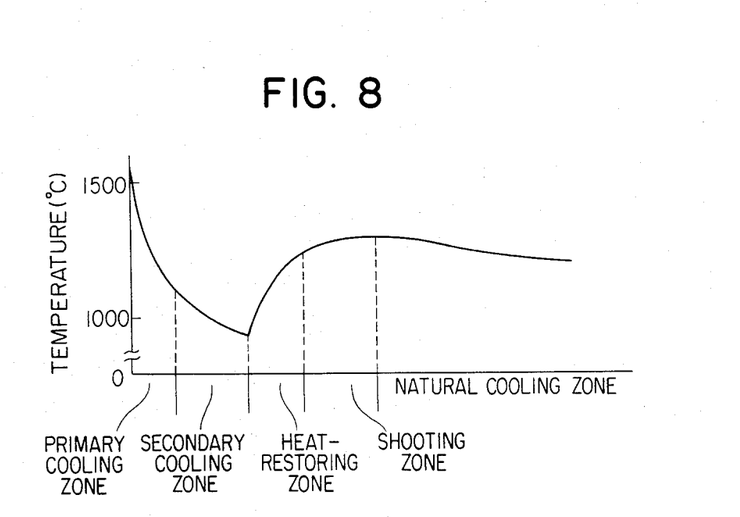
FIG. 8 is a graph illustrating the transition of the surface temperature of a solidified shell of a horizontally and continuously cast steel strand with the use of the apparatus of the present invention.

FIG. 8 is a graph illustrating the transition of the surface temperature of the solidified shell 5A of the cast steel strand 5 having a square cross-section with a side length of 115 mm when horizontally and intermittently withdrawing the cast steel strand 5 from the horizontal mold 2 by the plurality of cycles each comprising a pull and a push, with the use of the apparatus of the present invention as shown in FIG. 6. As is clear from FIG. 8, the surface temperature of the solidified shell 5A of the cast steel strand 5 decreases to about 950° C. immediately after passing through the secondary cooling zone, i.e., the cooling zone 6, but increases to about 1,250° C. immediately after passing through the heat-restoring zone 26. Therefore, by continuously ejecting the plurality of metal shots 15 onto the surface of the solidified shell 5A of the cast steel strand 5 in this state, the fine cold shut cracks produced on the surface portion of the solidified shell 5A of the cast steel strand 5 are easily welded and removed under the pressure applied by the plurality of metal shots 15 thus ejected. In FIG. 8, the primary cooling zone means the horizontal mold 2 which is cooled by cooling water circulating in the wall thereof, and the secondary cooling zone means the cooling zone 6 provided following the horizontal mold 2.

Figure 9:
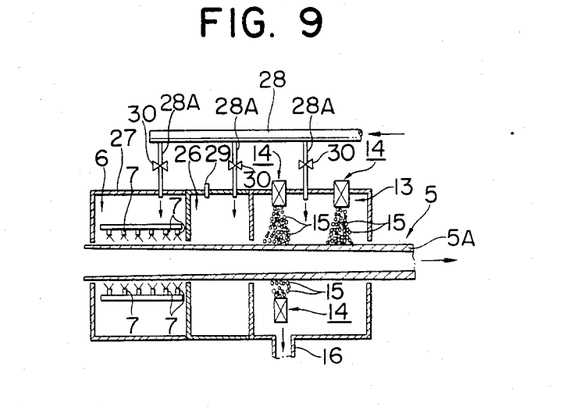
FIG. 9 is a schematic descriptive view illustrating another embodiment of the apparatus of the present invention.

FIG. 9 is a schematic descriptive view illustrating another embodiment of the apparatus of the present invention having an inert gas supply means for supplying an inert gas into the cooling zone 6, the heat-restoring zone 26 and the shooting zone 13. In this embodiment, the cooling zone 6, the heat-restoring zone 26 and the shooting zone 13 are covered by a cover 27, and the cooling zone 6, the heat-restoring zone 26 and the shooting zone 13 are kept in a non-oxidizing atmosphere by an inert gas such as nitrogen gas or argon gas supplied from an inert gas supply means into said zones 6, 26 and 13.

The inert gas supply means comprises an inert gas supply pipe 28 which communicates with the cooling zone 6, the heat-restoring zone 26 and the shooting zone 13 through respective branch pipes 28A each having a valve 30 for regulating the gas flow rate.

The amount of oxygen remaining in the cooling zone 6, the heat-restoring zone 26 and the shooting zone 13 is constantly measured by an oxygen concentration meter 29. The flow rate of the inert gas supplied into said zones 6, 26 and 13 is regulated by the valve 30 provided in each of the branch pipes 28A of the inert gas supply pipe 28 so that the amount of oxygen may not exceed a prescribed value.

Since the apparatus in the embodiment shown in FIG. 9 has the same construction as that of the apparatus of the present invention shown in FIGS. 6 and 7 except for the inert gas supply means for supplying the inert gas into the cooling zone 6, the heat-restoring zone 26 and the shooting zone 13, further description is not made here.

According to the above-mentioned embodiment, the fine cold shut cracks produced on the surface portion of the solidified shell 5A of the cast steel strand 5 are not oxidized during the period from the beginning of horizontal withdrawal of the cast steel strand 5 from the horizontal mold (not shown) up to the ejection of the plurality of metal shots 15. The fine cold shut cracks are thus more easily and more certainly welded and removed than in the case where said zone 6, 26 and 13 are not kept in a non-oxidizing atmosphere.

Figure 10:
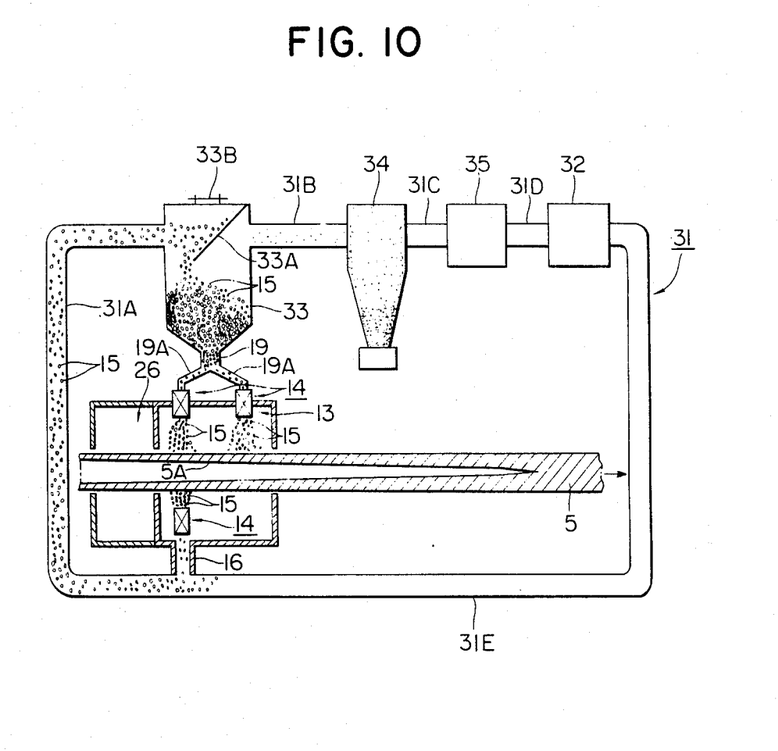
FIG. 10 is a schematic descriptive view illustrating further another embodiment of the apparatus of the present invention.

FIG. 10 is a schematic descriptive view illustrating further another embodiment of the present invention having a metal shot recycling means using a pneumatic carrier gas. In this embodiment, the plurality of metal shots 15 discharged from the shooting zone 13 after ejection onto the surface of the solidified shell 5A of the cast steel strand 5 are recycled by a metal shot recycling means using a pneumatic carrier gas into the plurality of shooters 14 in the shooting zone 13.

As shown in FIG. 10, the metal shot recycling means comprises: a looped pneumatic carrier pipe 31, the pneumatic carrier pipe 31 recycling the plurality of metal shots 15 discharged from the shooting zone 13 through a metal shot discharge pipe 16 after ejection onto the surface of the solidified shell 5A of the cast steel strand 5 into the plurality of shooters 14 in the shooting zone 13; a blower 32 for blowing the pneumatic carrier gas into the pneumatic carrier pipe 31, the blower 32 being provided in the middle of the pneumatic carrier pipe 31; a hopper 33 for storing the plurality of metal shots 15 sent through the pneumatic carrier pipe 31 and supplying same into the plurality of shooters 14 in the shooting zone 13, the hopper 33 being provided in the middle of the pneumatic carrier pipe 31 in the upstream of the blower 32; a dust collector 34 for removing dust produced from the cast steel strand 5 and the plurality of metal shots 15, the dust collector 34 being provided in the middle of the pneumatic carrier pipe 31 between the blower 32 and the hopper 33; and a dehumidifier 35 for removing humidity from the pneumatic carrier gas, the dehumidifier 35 being provided in the middle of the pneumatic carrier pipe 31 between the blower 32 and the dust collector 34.

The hopper 33 has a baffle plate 33A for deflecting the plurality of metal shots 15 sent through the pneumatic carrier pipe 31 to the upper portion of the interor of the hopper 33 to drop onto the bottom thereof. The hopper 33 has at the upper portion thereof a metal shot supply port 33B, which can be freely opened and closed for replenishing new metal shots.

The plurality of metal shots 15 discharged from the shooting zone 13 through the metal shot discharge port 16 are recycled into the plurality of shooters 14 in the shooting zone 13 as follows by means of the above-mentioned metal shot recycling means. As shown in FIG. 10, the plurality of metal shots 15 discharged from the shooting zone 13 through the metal shot discharge pipe 16 into the pneumatic carrier pipe 31A after ejection onto the surface of the solidified shell 5A of the cast steel strand 5 in the shooting zone 13, are sent by the pneumatic carrier gas through the pneumatic carrier pipe 31A to the hopper 33, where the plurality of metal shots 15 are deflected by the baffle plate 33A in the hopper 33, and drop onto the bottom of the hopper 33. The plurality of metal shots 15 thus stored in the hopper 33 are recycled through the metal shot supply pipe 19 and the respective branch pipes 19A to the plurality of shooters 14 in the shooting zone 13.

The pneumatic carrier gas after carrying the plurality of metal shots 15 to the hopper 33 not only contains dust produced from the cast steel strand 5 and the plurality of metal shots 15, but also is humidified by cooling water penetrating from the cooling zone (not shown) through the heat-restoring zone 26 into the shooting zone 13.

The pneumatic carrier gas containing dust and humidity as mentioned above flows from the hopper 33 through the pneumatic carrier pipe 31B into the dust collector 34, and then through the pneumatic carrier pipe 31C into the dehumidifier 35. The dust and the humidity are thus removed from the pneumatic carrier gas after transporting the plurality of metal shots 15. The pneumatic carrier gas after removal of dust and humidity returns through the pneumatic carrier pipe 31D to the blower 32 and then flows from the blower 32 through the pneumatic carrier pipe 31E again into the pneumatic carrier pipe 31A.

The construction of the apparatus in the embodiment shown in FIG. 10 is the same as that shown in FIGS. 6 and 7 except for the metal shot recycling means using the pneumatic carrier gas. Further explanation is therefore omitted here.

According to the embodiment described above, the plurality of metal shots 15 discharged from the shooting zone 13 are smoothly recycled to the plurality of shooters 14 in the shooting zone 13.

In the embodiment shown in FIG. 10, when an inert gas is supplied into the cooling zone 6, the heat-restoring zone 26 and the shooting zone 13 to keep these zones 6, 26 and 13 in a non-oxidizing atmosphere as in the embodiment shown in FIG. 9, an inert gas of the same kind as the inert gas supplied to these zones 6, 26 and 13 should be used as the pneumatic carrier gas.

Figure 11:
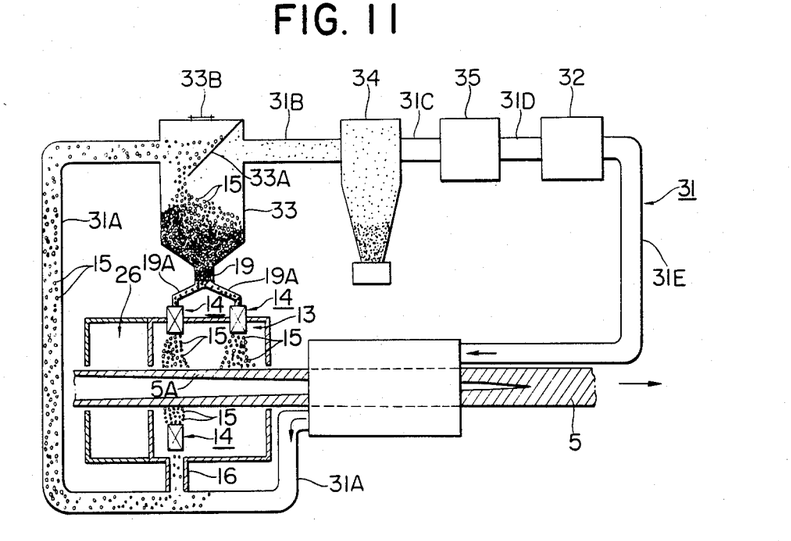
FIG. 11 is a schematic descriptive view illustrating further another embodiment of the apparatus of the present invention.

FIG. 11 is a schematic descriptive view illustrating further another embodiment of the present invention having a heat exchanger 36 for heating the pneumatic carrier gas. In this embodiment, the pneumatic carrier gas passing through the pneumatic carrier pipe 31A is heated through heat exchange with the cast steel strand 5 passing through the heat exchanger 36 provided in the middle of the pneumatic carrier pipe 31 in the downstream of the blower 32 and in the upstream of the shooting zone 13. The plurality of metal shots 15 which are wet by cooling water penetrating from the cooling zone (not shown) through the heat-restoring zone 26 into the shooting zone 13 are dried by the pneumatic carrier gas thus heated during transportation through the pneumatic carrier pipe 31A.

Figure 12:
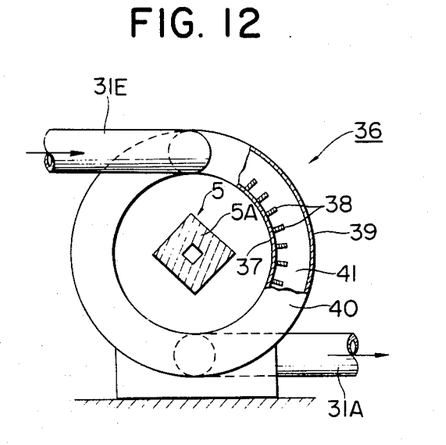
FIG. 12 is a partially cutaway side view of a heat exchanger used in the embodiment of the apparatus of the present invention shown in FIG. 11.

FIG. 12 is a partially cutaway side view of the heat exchanger 36. The heat exchanger 36 comprises: an inner cylinder 37 through which the cast steel strand 5 passes; a plurality of fines 38 for improving the efficiency of heat exchange, the plurality of fins 38 being fixed to the outer surface of the inner cylinder 37 along the axial line thereof and at intervals in the circumferential direction thereof; an outer cylinder 39 concentrically surrounding the inner cylinder 37 with a space therebetween; a pair of annular walls 40 each having an opening of the same diameter as that of the inner cylinder 37, the pair of annular walls 40 being fixed respectively to the both ends of the inner cylinder 37 and the outer cylinder 39; and a heating chamber 41 comprising the space defined by the inner cylinder 37, the outer cylinder 39 and the pair of annular walls 40.

The plurality of metal shots 15 which are wet by cooling water penetrating from the cooling zone 6 through the heat-restoring zone 26 into the shooting zone 13 are dried as follows by the apparatus shown in FIGS. 11 and 12. The pneumatic carrier gas sent from the blower 32 through the pneumatic carrier pipe 31E enters the heating chamber 41 of the heat exchanger 36, where the pneumatic carrier gas is heated through heat exchange with the high-temperature cast steel strand 5 passing through the inner cylinder 37 of the heat exchanger 36. The pneumatic carrier gas thus heated is sent to the pneumatic carrier pipe 31A. The plurality of metal shots 15 which are wet by the cooling water penetrating from the cooling zone (not shown) through the heat-restoring zone 26 into the shooting zone 13 are dried by the thus heated pneumatic carrier gas during transportation through the pneumatic carrier pipe 31A.

Since the apparatus shown in FIGS. 11 and 12 has the same construction as that of the apparatus shown in FIG. 10 except for the heat exchanger 36, further explanation is omitted here.

According to the above-mentioned embodiment, the following effects are available. If the plurality of metal shots 15 which are wet by the cooling water are oxidized and adhere to each other to form large lumps, and these lumps clog up the metal shot supply pipe 19, this would make it impossible to eject the plurality of metal shots 15. According to the embodiment mentioned above, however, the plurality of metal shots 15 are dried by the heated pneumatic carrier gas, thus causing no such problem. Further, drying of the plurality of metal shots 15 does not require any additional fuel at all.

In the above-mentioned embodiment, shown in FIGS. 11 and 12, when an inert gas is supplied into the cooling zone 6, the heat-restoring zone 26 and the shooting zone 13, as shown in FIG. 9, to keep these zones 6, 26 and 13 in a non-oxidizing atmosphere, an inert gas of the same kind as the inert gas supplied to these zones 6, 26 and 13 should be employed as the pneumatic carrier gas.

Now, the method of the present invention is described in more detail by means of examples.

EXAMPLE 1

The apparatus of the present invention shown in FIG. 6 was installed in the manner as shown in FIG. 6 on the conventional horizontal type continuous casting machine, and a cast steel strand 5 having a square cross-section with a side length of 115 mm of a structural steel was horizontally and intermittently withdrawn from the horizontal mold 2 at a withdrawal speed of 2.0 m/min. Then, the cast steel strand 5 was passed consecutively through the cooling zone 6, the heat-restoring zone 26 and the shooting zone 13. The solidified shell 5A of the cast steel strand 5 immediately after passing through the cooling zone 6 had a surface temperature of about 950° C., and immediately after passing through the heat-restoring zone 26, the solidified shell 5A of the cast steel strand 5 had a surface temperature of about 1,275° C. In the shooting zone 13, metal shots 15 made of steel having a diameter of about 1.4 mm were continuously ejected at a speed of about 70 m/sec from each of the shooters 14 onto the surface of the solidified shell 5A of the cast steel strand 5.

Observation of the surface of the cast steel strand 5 thus manufactured revealed a very slight number of fine cold shut cracks. This is attributable to the fact that fine cold shut cracks produced on the surface portion of the solidified shell 5A of the cast steel strand 5 were oxidized during the period from the withdrawal of the cast steel strand 5 from the horizontal mold 2 up to the ejection of the plurality of metal shots 15. However, after rolling the cast steel strand 5, the surface portion of the rolled product showed no surface cracks.

EXAMPLE 2

Then, nitrogen gas was supplied into the cooling zone 6, the heat-restoring zone 26 and the shooting zone 13 by means of the inert gas supply means as shown in FIG. 9 to maintain the oxygen concentration in the atmosphere of these zones 6, 26 and 13 at 0.5 vol. %. The cast steel strand 5 was manufactured under the same conditions as those in Example 1 described above except for the supply of the inert gas.

No fine cold shut cracks were observed on the surface of the cast steel strand 5 thus manufactured, and after rolling of the cast steel strand 5, no surface cracks were found in the rolled product.

According to the present invention, as described above, it is possible to substantially completely remove fine cold shut cracks in a horizontally and continuously cast steel strand, and furthermore, no fuel is needed for drying the plurality of wet metal shots, thus providing industrially useful effects.

What is claimed is:

1. A method for removing fine cold shut cracks on a horizontally and continuously cast steel strand using ejection of a plurality of metal shots, which comprises:
   horizontally and intermittently withdrawing a cast steel strand from a horizontal mould fitted to the lower portion of the side wall of a tundish containing molten steel by a plurality of cycles each comprising a pull and a push;
   spraying cooling water, in a cooling zone provided following said horizontal mold on the same horizontal level as that of said horizontal mold, onto the surface of a solidified shell of said cast steel strand passing through said cooling zone, to cool said cast steel strand;
   continuously ejecting a plurality of metal shots, in a shooting zone provided following said cooling zone on the same horizontal level as that of said cooling zone, onto the surface of said solidified shell of said cast steel strand passing through said shooting zone, to weld fine cold shut cracks produced on the surface portion of said solidified shell of said cast steel strand by said plurality of cycles each comprising a pull and a push under the pressure applied by means of said plurality of metal shots thus ejected, to remove said fine cold shut cracks;
   discharging, after said ejection onto the surface of said solidified shell of said cast steel strand, said plurality of metal shots from said shooting zone; and,
   directing said plurality of metal shots discharged from said shooting zone into said shooting zone for reuse in recycle;
   characterized by:
   providing a heat-restoring zone, substantially on the same horizontal level as that of said cooling zone and said shooting zone, between said cooling zone and said shooting zone, where the temperature of the surface portion of said solidified shell of said cast steel strand passing through said heat-restoring zone is re-increased with the use of heat of molten steel in the interior of said cast steel strand, to soften the surface portion of said solidified shell of said cast steel strand, thereby facilitating said welding and said removal of said fine cold shut cracks in said shooting zone.

2. The method as claimed in claim 1, characterized by:
   supplying an inert gas into said cooling zone, said heat-restoring zone and said shooting zone to keep said cooling zone, said heat-restoring zone and said shooting zone in a non-oxidizing atmosphere.

3. The method as claimed in claim 1, characterized by:
   recycling for reuse said plurality of metal shots discharged from said shooting zone after said ejection onto the surface of said solidified shell of said cast steel strand into said shooting zone by means of a pneumatic carrier gas.

4. The method as claimed in claim 2, characterized by:
   recycling for reuse said plurality of metal shots discharged from said shooting zone after said ejection onto the surface of said solidified shell of said cast steel strand into said shooting zone by means of a pneumatic carrier gas comprising an inert gas.

5. The method as claimed in claim 3, characterized by:
   heating said pneumatic carrier gas through heat exchange with said cast steel strand, and drying, by means of said pneumatic carrier gas thus heated, said plurality of metal shots which are wet by cooling water penetrating from said cooling zone through said heat-restoring zone into said shooting zone.

6. The method as claimed in claim 4, characterized by:
   heating said pneumatic carrier gas comprising said inert gas through heat exchange with said cast steel strand, and drying, by means of said pneumatic carrier gas comprising said inert gas thus heated, said plurality of metal shots which are wet by cooling water penetrating from said cooling zone through said heat-restoring zone into said shooting zone.

7. An apparatus for removing fine cold shut cracks on a horizontally and continuously cast steel strand using ejection of a plurality of metal shots, which comprises:
   a cooling zone provided, on the same horizontal level as that of a horizontal mold fitted to the lower portion of a tundish containing molten steel, following said horizontal mold, said cooling zone having a plurality of spray nozzles for ejecting cooling water from above and below a cast steel strand onto the surface of a solidified shell of said cast steel strand horizontally and intermittently withdrawn from said horizontal mold by a plurality of cycles each comprising a pull and a push and then passing through said cooling zone, to cool said cast steel strand;
   a shooting zone provided following said cooling zone on the same horizontal level as that of said cooling zone, said shooting zone having a plurality of shooters for continuously ejecting a plurality of metal shots, from above and below said cast steel strand, onto the surface of said solidified shell of said cast steel strand passing through said shooting zone to weld and remove fine cold shut cracks produced on the surface portion of said solidified shell of said cast steel strand due to said plurality of cycles each comprising a pull and a push, by means of the pressure applied by said plurality of metal shots thus ejected; and, a metal shot recycling means for recycling for reuse said plurality of metal shots discharged from said shooting zone after said ejection onto the surface of said solidified shell of said cast steel strand into said plurality of shooters in said shooting zone; characterized by comprising:

a heat-restoring zone (26) provide substantially on the same horizontal level as that of said cooling zone (6) and said shooting zone (13) between said cooling zone (6) and said shooting zone (13), and including means for re-increasing the temperature of the surface portion of said solidified shell (5A) of said cast steel strand (5) passing through said heat-restoring zone (26), with the use of heat of molten steel in the interior of said cast steel strand (5) to soften the surface portion of said solidified shell (5A) of said cast steel strand (5).

8. The apparatus as claimed in claim 7, further comprising:

an inert gas supply means for supplying an inert gas into said cooling zone (6), said heat-restoring zone (26) and said shooting zone (13) to keep said cooling (16), said heat-restoring zone (26) and said shooting zone (13) in a non-oxidizing atmosphere, said inert gas supply means comprising an inert gas supply pipe (28), and said inert gas supply pipe (28) communicating through respective branch pipes (28A) with said cooling zone (6), said heat-restoring zone (26) and said shooting zone (13).

9. The apparatus as claimed in claim 7, wherein:

said metal shot recycling means comprises: (a) a pneumatic carrier pipe (31) for recycling said plurality of metal shots (15) discharged from said shooting zone (13) after said ejection onto the surface of said solidified shell (5A) of said cast steel strand (5), by means of a pneumatic carrier gas, into said plurality of shooters (14) in said shooting zone (13); (b) a blower (32) provided in the middle of said pneumatic carrier pipe (31) for blowing said pneumatic carrier gas into said pneumatic carrier pipe (31); (c) a hopper (33) provided in the middle of said pneumatic carrier pipe (31) in the upstream of said blower (32) for storing said plurality of metal shots (15) sent through said pneumatic carrier pipe (31) and supplying same into said plurality of shooters (14) in said shooting zone (13); (d) a dust collector (34) provided in the middle of said pneumatic carrier pipe (31) between said blower (32) and said hopper (33) for removing dust produced from said cast steel strand (5) and said plurality of metal shots (15); and (e) a dehumidifier (35) provided in the middle of said pneumatic carrier pipe (31) between said blower (32) and said dust collector (34) for removing humidity from said pneumatic carrier gas.

10. The apparatus as claimed in claim 8, wherein:

said metal shot recycling means comprises: (a) a pneumatic carrier pipe (31) for recycling said plurality of metal shots (15) discharged from said shooting zone (13) after said ejection onto the surface of said solidified shell (5A) of said cast steel strand (5), by means of a pneumatic carrier gas comprising an inert gas, into said plurality of shooters (14) in said shooting zone (13); (b) a blower (32) provided in the middle of said pneumatic carrier pipe (31) for blowing said pneumatic carrier gas comprising said inert gas into said pneumatic carrier pipe (31); (c) a hopper (13) provided in the middle of said pneumatic carrier pipe (31) in the upstream of said blower (32) for storing said plurality of metal shots (15) sent through said pneumatic carrier pipe (31) and supplying same into said plurality of shooters (14) in said shooting zone (13); (d) a dust collector (34) provided in the middle of said pneumatic carrier pipe (31) between said blower (32) and said hopper (33) for removing dust produced from said cast steel strand (5) and said plurality of metal shots (15); and (e) a dehumidifier (35) provided in the middle of said pneumatic carrier pipe (31) between said blower (32) and said dust collector (34) for removing humidity from said pneumatic carrier gas comprising said inert gas.

11. The apparatus as claimed in claim 9, further comprising:

a heat exchanger (36) provided in the middle of said pneumatic carrier pipe (31) in the downstream of said blower (32) and in the upstream of said shooting zone (13) for heating said pneumatic carrier gas through heat exchange with said cast steel strand (5) passing through said heat exchager (36), and said heated pneumatic carrier gas drying said plurality of metal shots (15) which are wet by cooling water penetrating from said cooling zone (6) through said heat-restoring zone (26) into said shooting zone (13).

12. The apparatus as claimed in claim 10, further comprising:

a heat exchanger (36) provided in the middle of said pneumatic carrier pipe (31) in the downstream of said blower (32) and in the upstream of said shooting zone (13) for heating said pneumatic carrier gas comprising an inert gas through heat exchange with said cast steel strand (5) passing through said heat exchanger, (36) and said heated pneumatic carrier gas comprising said inert gas drying said plurality of metal shots (15) which are wet by cooling water penetrating from said cooling zone (6) through said heat-restoring zone (26) into said shooting zone (13).

* * * * *

UNITED STATES PATENT AND TRADEMARK OFFICE
CERTIFICATE OF CORRECTION

PATENT NO. : 4,532,980
DATED : August 6, 1985
INVENTOR(S) : Yoshiharu MIYAWAKI et al It is certified that error appears in the above-identified patent and that said Letters Patent is hereby corrected as shown below:

On the initial page of patent, in the heading, change
"[76] Inventors:" to --[75] Inventors:--;

On the initial page of patent, in the heading, insert
the following Assignment data:
--[73] Assignee: Nippon Kokan Kabushiki Kaisha,
Tokyo, Japan--;

Column 15, line 11, change "provide" to --provided--;

Column 15, line 27, change "(16)" to --zone (6)--;

Column 16, line 37, change "exchager" to --exchanger--;

Column 16, line 51, change "exchanger, (36)" to
--exchanger (36),--.

Signed and Sealed this

Twenty-fourth Day of June 1986

[SEAL]

Attest:

DONALD J. QUIGG

Attesting Officer

Commissioner of Patents and Trademarks